(12) United States Patent
Ady

(10) Patent No.: US 9,472,206 B2
(45) Date of Patent: Oct. 18, 2016

(54) PRIVACY MODE FOR ALWAYS-ON VOICE-ACTIVATED INFORMATION ASSISTANT

(71) Applicant: MOTOROLA MOBILITY LLC, Chicago, IL (US)

(72) Inventor: Roger W. Ady, Chicago, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 12 days.

(21) Appl. No.: 14/296,545

(22) Filed: Jun. 5, 2014

(65) Prior Publication Data

US 2014/0372126 A1 Dec. 18, 2014

Related U.S. Application Data

(60) Provisional application No. 61/835,677, filed on Jun. 17, 2013.

(51) Int. Cl.
*G10L 21/00* (2013.01)
*G10L 25/48* (2013.01)
(Continued)

(52) U.S. Cl.
CPC ............. *G10L 25/48* (2013.01); *G06F 3/017* (2013.01); *G06F 3/167* (2013.01); *G10L 15/22* (2013.01); *G10L 15/26* (2013.01)

(58) Field of Classification Search
CPC .... G06F 3/017; G06F 3/0482; G06F 3/0488; G06F 3/04883; G06F 3/165; G06F 3/167; G10L 15/22; G10L 15/26; G10L 15/265; G10L 17/26
USPC ............ 704/201, 270, 275, 270.1, 263, 208
See application file for complete search history.

(56) References Cited

U.S. PATENT DOCUMENTS 6,219,645 B1 4/2001 Byers
6,219,745 B1 4/2001 Strongin et al.
(Continued)

FOREIGN PATENT DOCUMENTS

EP 1 063 636 A2 12/2000

OTHER PUBLICATIONS

International Search Report and Written Opinion of International application No. PCT/US2014/042735, mailed Sep. 29, 2014, 11 pgs.

(Continued)

*Primary Examiner* — Vijay B Chawan
(74) *Attorney, Agent, or Firm* — Shumaker & Sieffert, P.A.

(57) ABSTRACT

A user device and method discriminately provides audible responses to a voice command received by a user device that supports voice activation. The method includes detecting a first pre-established, audible activation command that activates the user device. In response to detecting the first pre-established, audible activation command, the method includes producing a first audible acknowledgement within loudspeaker proximity of the user device and then monitoring for detection of at least one second, audible acknowledgement produced by another user device within a pre-set time interval, which detection would indicate that the other user device is also responding. The method includes processing and responding to a received audible command in response to not detecting. However, in response to detecting, the method includes triggering entry into a privacy mode of audible command input and producing a privacy mode announcement via at least one of a display and a sound producing component.

22 Claims, 7 Drawing Sheets

(51) Int. Cl.
*G06F 3/01* (2006.01)
*G10L 15/22* (2006.01)
*G06F 3/16* (2006.01)
*G10L 15/26* (2006.01)

(56) References Cited

U.S. PATENT DOCUMENTS

| | | | |
|---|---|---|---|
| 6,662,137 | B2 | 12/2003 | Squibbs |
| 8,275,404 | B2 * | 9/2012 | Berger .................. G06Q 10/06 455/404.1 |
| 8,340,975 | B1 | 12/2012 | Rosenberger |
| 8,666,804 | B2 * | 3/2014 | Barnes, Jr. ......... G06Q 10/1053 705/14.1 |
| 2002/0193989 | A1 * | 12/2002 | Geilhufe ................ G10L 15/26 704/208 |
| 2005/0041793 | A1 * | 2/2005 | Fulton ............... H04M 3/42263 379/211.01 |
| 2005/0174229 | A1 * | 8/2005 | Feldkamp ........ G08B 13/19656 340/506 |
| 2008/0117029 | A1 * | 5/2008 | Dohrmann ........... G08B 25/001 340/286.02 |
| 2012/0166184 | A1 * | 6/2012 | Locker .................... G10L 15/22 704/201 |
| 2012/0311508 | A1 * | 12/2012 | Fleizach ............... G06F 3/0488 715/863 |

OTHER PUBLICATIONS

International Preliminary Report on Patentability from International Application No. PCT/US2014/042735, mailed Dec. 30, 2015, 9 pp.

* cited by examiner

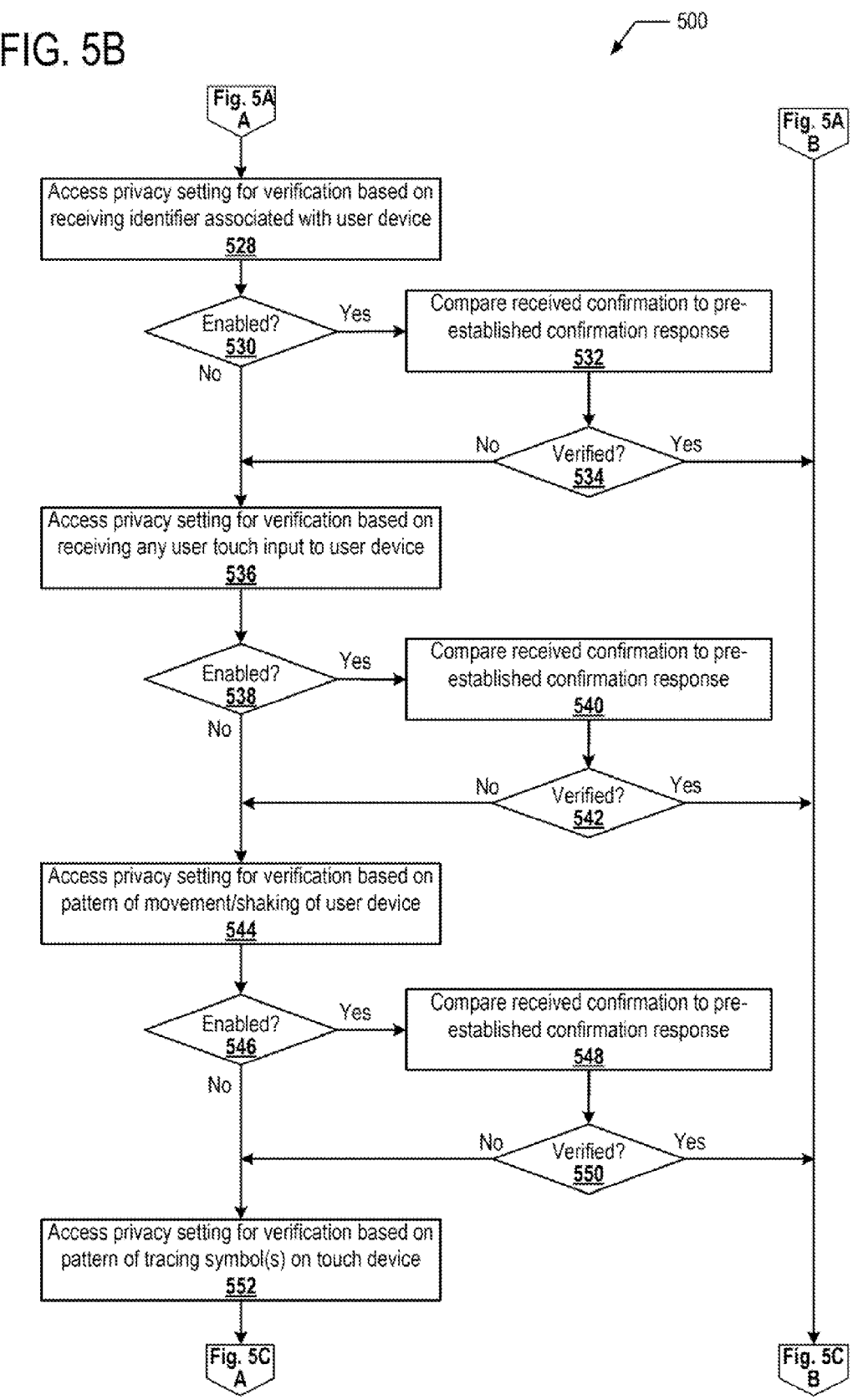

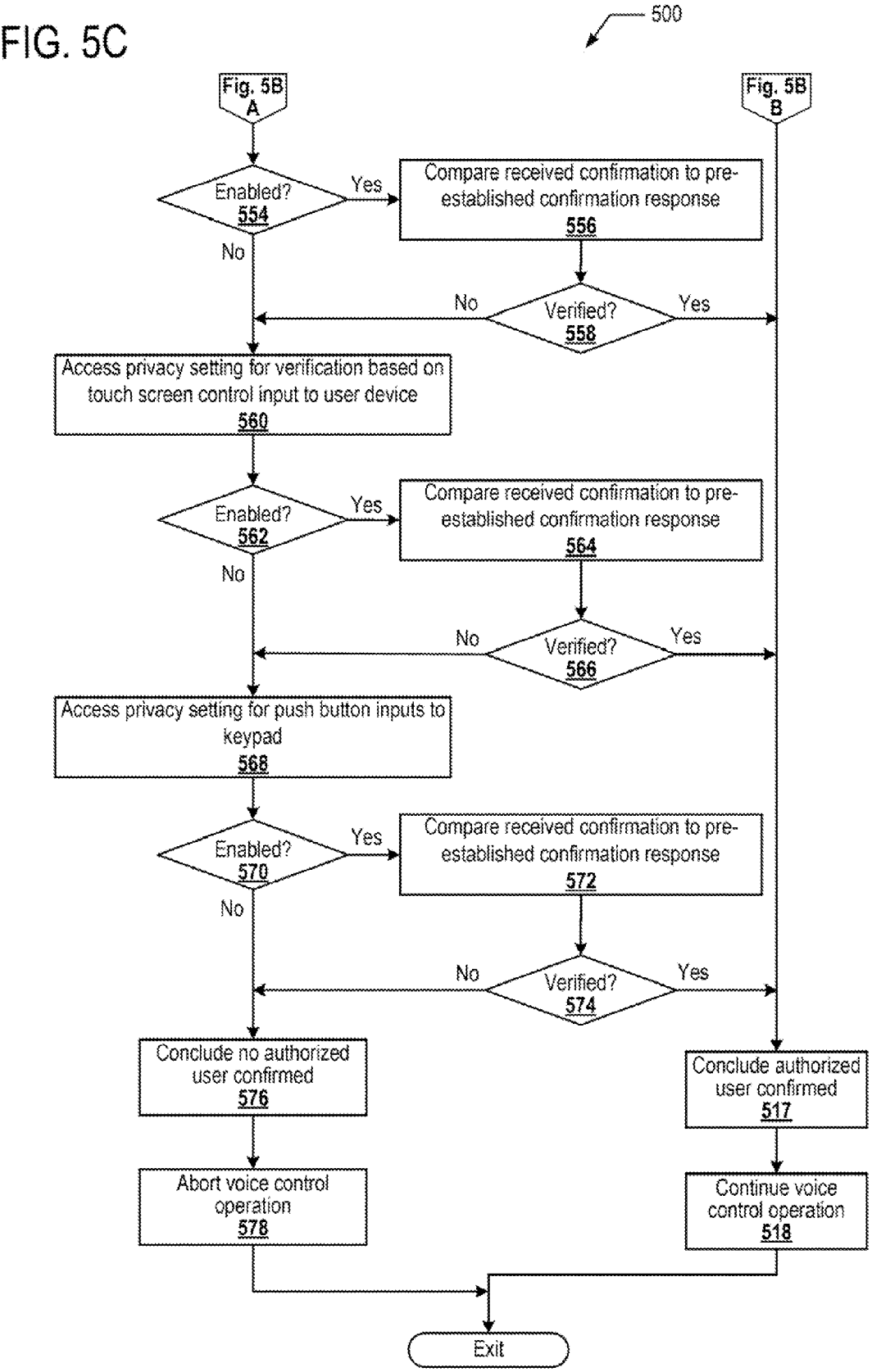

PRIVACY MODE FOR ALWAYS-ON VOICE-ACTIVATED INFORMATION ASSISTANT

BACKGROUND

1. Technical Field

The present disclosure generally relates to controlling personal electronic devices with audible commands and in particular to providing privacy for audible responses by personal electronic devices.

2. Description of the Related Art

Personal electronic devices such as smart phones are becoming ubiquitous, as the devices provide a source of entertainment, communication, navigation, and personal assistance. While these user devices are designed with graphical and tactile interfaces, the use of voice commands is quickly becoming a common way to interact with and/or control these user devices. Some voice commands cause the user device to read back to the user personal information, such as the content of messages, in a hands free manner, i.e., without use of a tactile user interface of the user device, such as a touch screen or button controls. If the user is not listening via an earpiece or is not located in a private location, the audible presentation of this information can be problematic and can even be embarrassing.

BRIEF DESCRIPTION OF THE DRAWINGS

The disclosure will best be understood by reference to the following detailed description of illustrative embodiments when read in conjunction with the accompanying drawings, wherein:

FIGS. 5A-5C are flow diagrams of an example method of challenging, receiving, and verifying operations of the example method of FIG. 4 including audible and/or tactile user responses, in accordance with one or more embodiments.

DETAILED DESCRIPTION

Figure 1:
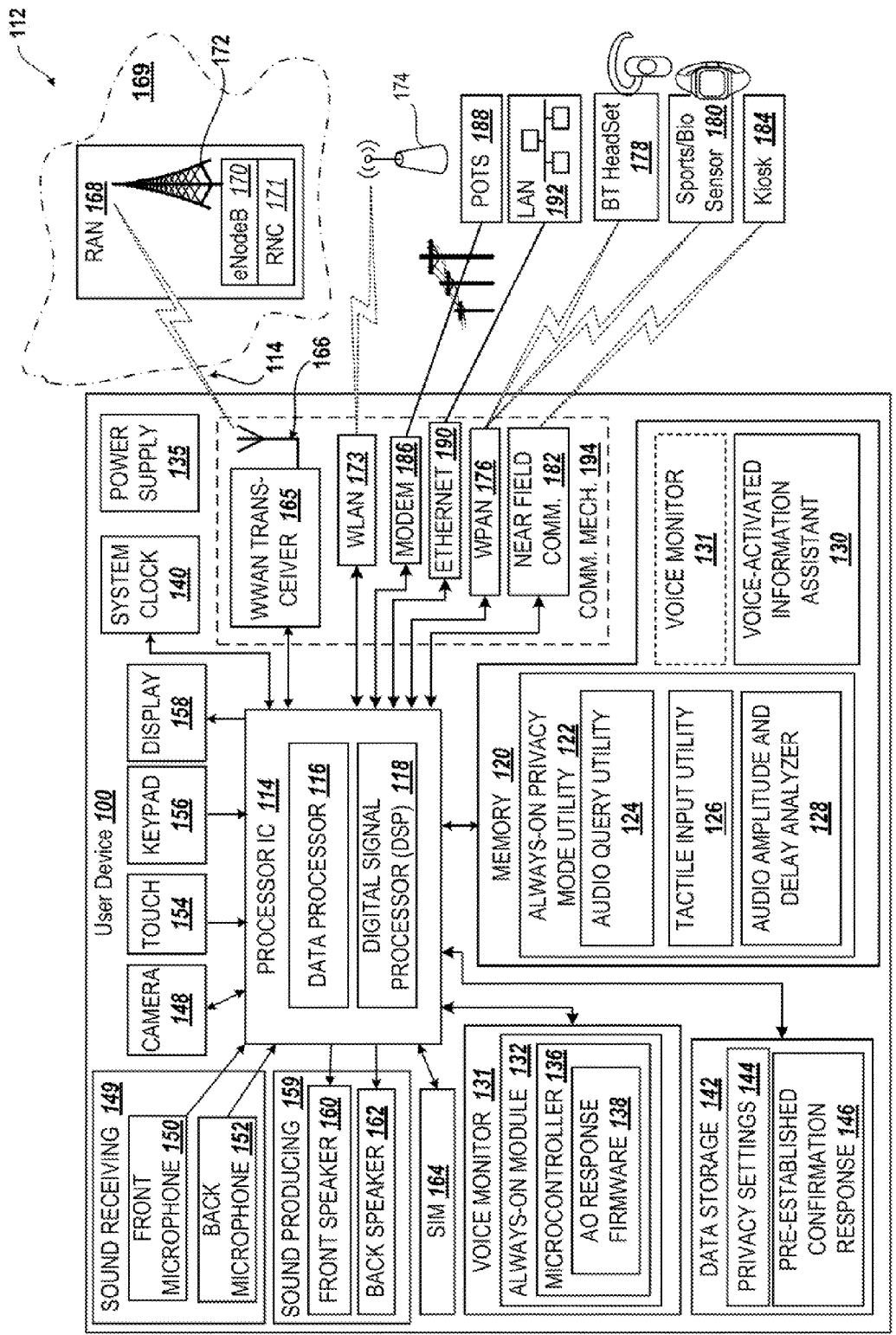
FIG. 1 provides a block diagram representation of an example user device configured with various components that enable one or more described features of the disclosure, according to one embodiment.

The illustrative embodiments of the present disclosure provide a method and a user device that discriminately provide audible responses to a voice command received by a user device that supports voice activation. According to one aspect, the user device includes: audio receiving mechanisms that detect a first pre-established, audible activation command that activates the user device. In response to detecting the first pre-established, audible activation command, the user device produces a first audible acknowledgement within loudspeaker proximity of the user device. The user device monitors for detection of at least one second, audible acknowledgement produced by another user device within a pre-set time interval. In response to not detecting any second, audible acknowledgement within the pre-set time interval, the user device processes and responds to a received audible command in response to not detecting any second, audible acknowledgement within the pre-set time interval. In response to detecting at least one second, audible acknowledgement within the pre-set time interval, the user device triggers entry into a privacy mode of audible command input and produces a privacy mode announcement via at least one of a display and a sound producing component.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof.

Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention.

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein.

Turning now to FIG. 1, there is depicted a block diagram representation of an example user device within which several of the features of the disclosure can be implemented. According to the general illustration, first user device 100 includes voice and/or audio processing components and can be voice activated, and which discriminately provides audible responses to a received voice command. The first user device 100 can be one of a host of different types of devices, including but not limited to, a mobile cellular phone or smart-phone, a laptop, a net-book, an ultra-book, and/or a tablet computing device. These various devices all provide and/or include the necessary hardware and software to enable voice activation and discriminately providing audible responses for privacy. Additionally, the first user device 100 includes the hardware and software to support the various wireless or wired communication functions as part of a communication system 112.

Referring now to the specific component makeup and the associated functionality of the presented components, first user device 100 can include a processor integrated circuit (IC) 114, which connects via a plurality of bus interconnects (illustrated by the bi-directional arrows) to a plurality of functional components of first user device 100. Processor IC 114 can include one or more programmable microprocessors, such as a data processor 116 and a digital signal processor (DSP) 118, which may both be integrated into a single processing device, in some embodiments. The processor IC 114 controls the communication, user interface, and other functions and/or operations of first user device 100. These functions and/or operations thus include, but are not limited to, application data processing and signal processing. The present innovation can be implemented using hardware component equivalents such as special purpose hardware, dedicated processors, general purpose computers, microprocessor based computers, micro-controllers, optical computers, analog computers, dedicated processors and/or dedicated hard wired logic. Connected to processor IC 114 is memory 120, which can include volatile memory and/or non-volatile memory.

One or more executable applications can be stored within memory 120 for execution by data processor 116 on processor IC 114. For example, memory 120 is illustrated as containing an always-on privacy mode utility 122, which can include an audio query utility 124, a tactile input utility 126, and an audio amplitude and delay analyzer utility 128. In at least the illustrated embodiment, memory 120 also contains a voice-activated information assistant 130 for responding to voice commands. The associated functionality and/or usage of each of the software modules will be described in greater detail within the descriptions which follow. In particular, the functionality associated with and/or provided by the always-on privacy mode utility 122 is described in greater detail with the description of FIG. 2 and several of the flow charts and other figures.

In one embodiment, memory 120 can include a voice monitor utility 131 (depicted in phantom) executed by processor IC 114 to support voice activation of the user device 100. Alternatively as depicted in FIG. 1, user device 100 can include an always-on (AO) module 132 that is independently powered by a power supply 135. AO module 132 can include a voice monitor 131 and a microcontroller 136 having always-on (AO) response firmware 138 optimized to use a minimal amount of power to detect one or more pre-determined voice activation sounds. Thereby, the processor IC 114 can conserve power for the first user device 100 by entering a power saving mode, to include a reduced clock rate from system clock 140 or shutting down or placing in a sleep mode one or more portions of the first user device 100, including the processor IC 114. The system clock 140 can also serve as a chronometer or basis for timers.

Also shown coupled to processor IC 114 is a data storage device 142 which can be any type of available storage device capable of storing one or more application software and data. It is further appreciated that in one or more alternate embodiments, the data storage device 142 storage can actually be remote storage and not an integral part of the device itself. As provided, data storage device 142 can contain privacy settings 144 and one or more pre-established confirmation responses 146. The specific usage and/or functionality associated with these components are described in greater detail in the following descriptions.

First user device 100 also comprises one or more input/output devices, including one or more input devices, such as camera 148, sound receiving components 149 depicted as a front microphone 150 and back microphone 152, touch screen and/or touch pad 154, keypad 156, and/or one or more output devices, such as display 158, sound producing components 159 depicted as front speaker 160 and back speaker 162, and others. First user device 100 can also include a subscriber information module (SIM) 164 which can provide unique identification of the subscriber that owns or utilizes the first user device 100, as well as specific contacts associated with the particular subscriber.

To support the wireless communication, first user device 100 includes one or more communication components, including wireless wide area network (WWAN) transceiver 165 with connected antenna 166 to communicate with a radio access network (RAN) 168 of a cellular network 169. The RAN 168 is generally represented as including a base station, depicted as an evolved base node ("eNodeB") 170 controlled by a radio network controller (RNC) 171 that transceives over a base station antenna 172. For clarity, one connected antenna 166 is depicted. However, the first user device 100 may contain more than one antenna, each antenna having one or more selected bandwidths of operation to support different modes of communication or for simultaneous communication in different communication technologies.

Alternatively or in addition to a WWAN transceiver 165, first user device 100 can include a wireless local access network (WLAN) module 173 to communicate with wireless devices and networks, depicted as a wireless access point 174. Alternatively or in addition, the first user device 100 can include a wireless personal access network (WPAN) transceiver 176 to communication with WPAN devices, depicted as a Bluetooth® headset 178 and a sports/biometric sensor 180. WPAN can include technologies such as IrDA, Wireless USB, Bluetooth®, Z-Wave, ZigBee, Body Area Network, and ANT+. Alternatively or in addition, the first user device 100 can include a near field communication (NFC) transceiver module 182, such as can be utilized for exchanging files with another user device or a payment kiosk 184.

As a device supporting wireless communication, first user device 100 can be one of, and be referred to as, a system, device, subscriber unit, subscriber station, mobile station (MS), mobile, mobile device, remote station, remote terminal, user terminal, terminal, communication device, user agent, cellular telephone, a satellite phone, a cordless telephone, a Session Initiation Protocol (SIP) phone, a wireless local loop (WLL) station, a personal digital assistant (PDA), a handheld device having wireless connection capability, a computing device, such as a laptop, tablet, smart phone, personal digital assistant, or other processing devices connected to a wireless modem.

As further illustrated, first user device 100 can also include components for wired communication, such as modem 186 for communicating over a plain old telephone system (POTS) 188 and Ethernet module 190 for connecting to a local access network (LAN) 192. Collectively, these wireless and wired components provide a communication mechanism 194 by which first user device 100 can communicate with other devices and networks.

Figure 2:
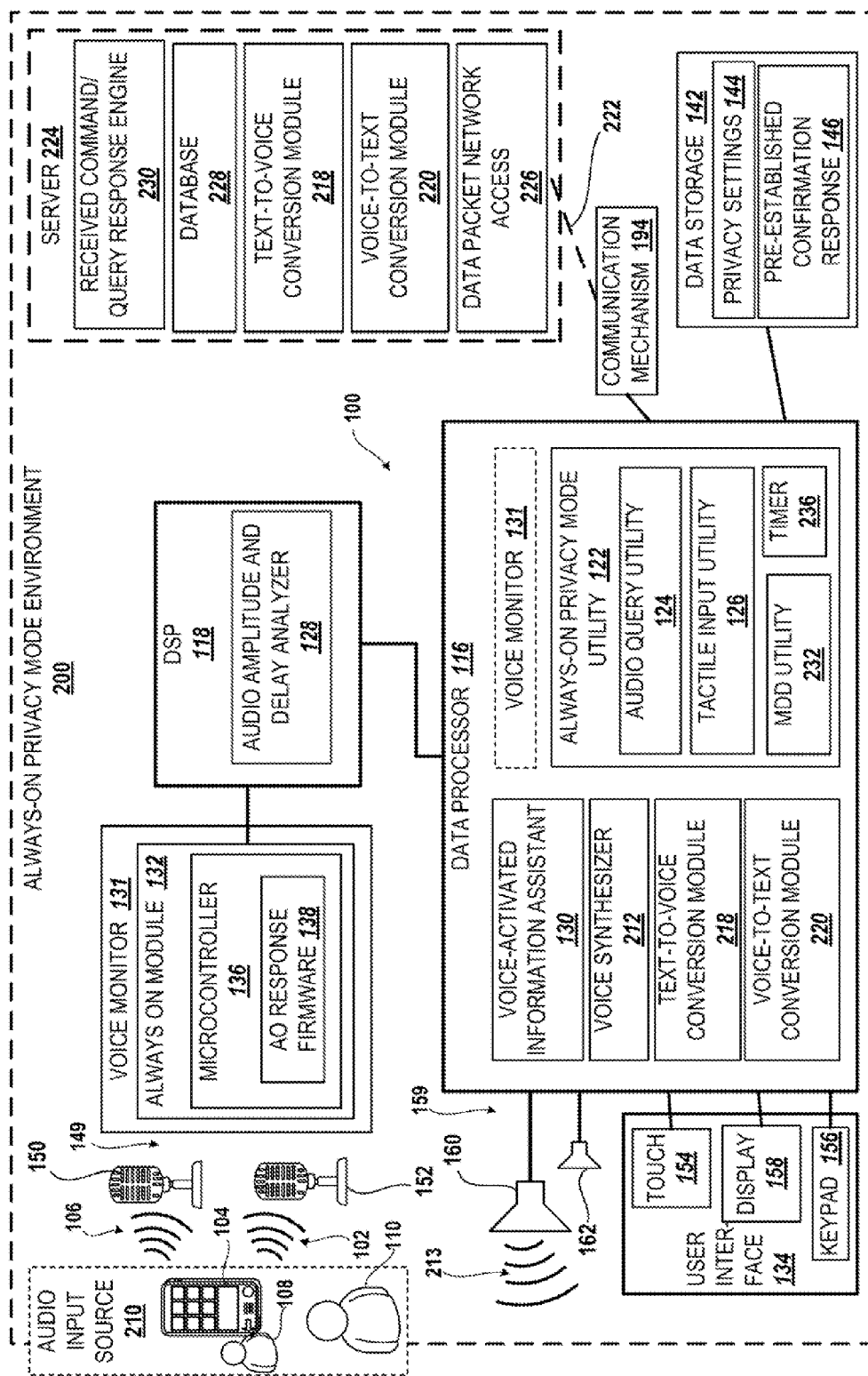
FIG. 2 illustrates an example always-on voice-activated information assistant environment with functional components thereof, according to one or more embodiments.

Turning now to FIG. 2, a diagram of an example always-on privacy mode environment 200 is illustrated. When voice activation signal 102 (i.e., first pre-established, audible activation command) is received from an audio input source 210, the first user device 100 employs mechanisms and techniques to discern whether the first user device 100 is in a multiple device environment, depicted as containing a second user device 104. This discernment by the first user device 100 can be triggered by detecting an audible acknowledgement 106 from the second user device 104 to the voice activation signal 102. When in a multiple device environment, another user 108 associated with the second user device 104 may be the source of the voice activation signal 102 rather than an authorized user 110 associated with the first user device 100.

The always-on privacy mode environment 200 includes a combination of hardware, firmware, software and data components, which collectively perform the various aspects of the disclosure by execution of the always-on privacy mode utility 122 and other functional components on data processor 116 and/or embedded device controllers. As shown, the always-on privacy mode environment 200 includes the always-on module 132 having the microcontroller 136 with always-on response firmware 138. The always-on module 132 receives the voice activation signal 102 from the audio input source 210 via at least one sound receiving component 149, depicted as front microphone 150 and back microphone 152.

The data processor 116 executes components, or communicates with distributed components that are remotely executed, that include a voice-activated information assistant 130, which responds and performs actions in response to user audible commands. A voice synthesizer 212 can produce audible responses 213 over at least one sound producing component 159, which can be the front speaker 160 and/or the back speaker 162. The data processor 116 can further execute a text-to-voice conversion module 218 and a voice-to-text conversion module 220. Alternatively or in addition, the always-on privacy mode environment 200 includes a distributed architecture, depicted as the first user device 100 communicating via a data packet network 222 to a server 224. The communication mechanism 194 of the first user device 100 can communicate with a data packet network access component 226 of the server 224. For example, certain functions such as the text-to-voice conversion module 218 and a voice-to-text conversion module 220 can be downloaded from server 224 or be provided as remote functions on server 224. The server 224 can also provide additional user information from a database 228 and additional query functionality from a received command/query response engine 230.

The first user device 100 can access locally or remotely stored data or programs within data storage device 142, depicted as containing privacy settings 144 and pre-established confirmation response 146. The data processor 116 also executes the always-on privacy mode utility 122, which can include an audio query utility 124 to select user queries, and a tactile input utility 126 to evaluate user tactile inputs in response to being in a privacy mode. The always-on privacy mode utility 122 includes a timer 236 for gauging a length of time in which another user device within loudspeaker proximity can be reasonably expected to be detected producing an audible acknowledgement to the same audible activation. The data processor 116 also communicates with user interface 134 having one or more of a touch screen or touch pad 154, display 158 and keypad 156.

The always-on privacy mode utility 122 executes on the data processor 116 and configures the first user device 100 (FIG. 1) to detect, via the at least one sound receiving component 149, a first pre-established, audible activation command that activates the first user device 100. In response to detecting the first pre-established, audible activation command, the first user device 100 produces, via the at least one sound producing component 159, a first audible acknowledgement within loudspeaker proximity of the first user device 100. The first user device 100 monitors, via the at least one sound receiving component 149, for detection of at least one second, audible acknowledgement produced by another user device within a pre-set time interval as provided by timer 236. In response to not detecting any second, audible acknowledgement within the pre-set time interval, the voice-activated information assistant 130 processes and responds to a received audible command in response to the always-on privacy mode utility 122 not detecting any second, audible acknowledgement within the pre-set time interval.

In response to the always-on privacy mode utility 122 detecting at least one second, audible acknowledgement within the pre-set time interval of timer 236, the always-on privacy mode utility 122 triggers entry of the first user device 100 into a privacy mode of audible command input. The voice synthesizer 212 produces a privacy mode announcement via at least one of the display 158 and the at least one sound producing component 159. For example, the privacy mode announcement can indicate that multiple devices have been detected responding to the pre-established audible activation command and can further indicate that loudspeaker playback is disabled. Thus, in one embodiment, the first user device 100 can automatically revert to a hand-held mode for user interaction wherein the first user device 100 processes and responds to a subsequently received command in response to receiving a tactile control input to the user interface 134 of the user device 100.

Alternatively or in addition to responding to tactile control inputs during this version of a privacy mode, the always-on privacy mode utility 122 can configure the first user device 100 to respond to voice commands that are determined to be made directly within hand-held or earpiece proximity. For example, the audio amplitude and delay analyzer utility 128 can respond to the at least one sound receiving component 149 receiving an audible command by measuring a volume magnitude of the audible command. Further, the audio amplitude and delay analyzer utility 128 can compare the volume magnitude to a loudness threshold that is pre-selected to indicate when a user is speaking directly into the first user device 100. In response to the volume magnitude exceeding the loudness threshold, the voice-activated information assistant 130 is allowed to process and respond to the audible command.

In one or more embodiments of the present disclosure, the always-on privacy mode utility 122 can configure the first user device 100 to continue responding to voice commands with privacy maintained by verifying that such voice commands come from an authorized user 110. To that end, the audio query utility 124 of the always-on privacy mode utility 122 can generate a challenge requesting confirmation that the first pre-established, audible activation command originated from an authorized user of the user device. The at least one sound receiving component 149 receives a confirmation response to the challenge. In response to the received confirmation response being verified by the audio query utility 124 as a pre-established confirmation response that is assigned to the user device 100, the always-on privacy mode utility 122 processes and responds to a received audible command.

The privacy settings 144 can indicate that the always-on privacy mode utility 122 can generate the challenge in a selected manner or simultaneously in multiple manners. For example, the user interface 134 can convey the challenge to the authorized user 110 as an audible output, a visual output and/or a haptic output. Similarly, the privacy settings 144 can indicate that the always-on privacy mode utility 122 can receive the confirmation from the authorized user 110 in one or more manners. For example, the user interface 134 can receive a user input that is an audible response, a visual confirmation from the camera 148, or a tactile input. Alternatively or in addition, manual selection of an input accessory such as Bluetooth headset 178 that privately communicates with the authorized user 110 can terminate the need for privacy mode. Alternatively, the respective manners of generating and receiving can be limited and pre-configured.

As a first example, the always-on privacy mode utility 122 can configure the first user device 100 to generate a challenge requesting confirmation that the first pre-established, audible activation command originated from an authorized user of the first user device 100 by producing, via the at least one sound producing component 159, a challenge query that solicits the pre-established confirmation response 146 as an audible response detectable within the loudspeaker proximity of the first user device 100. The at least one sound receiving component 149 receives an audible confirmation response to the challenge query produced. The audio query utility 124 verifies that the first pre-established, audible activation command originated from an authorized user 110 of the first user device 100 by comparing the received audible confirmation response to the pre-established confirmation response 146 for a match. For example, the received audible confirmation response 146 can be a pre-selected one of a specific identifier assigned to the first user device 100 and a pre-recorded name of the authorized user. The multiple device detection (MDD) utility 232 can then respond by enabling the voice-activated information assistant 130 to respond to a subsequent voice command.

In yet another embodiment, the always-on privacy mode utility 122 further configures the first user device 100 to generate a challenge requesting confirmation that the first pre-established, audible activation command originated from an authorized user of the first user device 100 by producing, via the at least one sound producing component 159, a challenge query that is audible within a loudspeaker proximity of the first user device 100. The at least one sound receiving component 149 receives the confirmation response to the challenge by detecting a tactile user input at the user interface 134 of the user device 100. Thereby, the tactile input utility 126 of the always-on privacy mode utility 122 can verify that the first pre-established, audible activation command originated from an authorized user of the first user device 100 based on the user providing the tactile user input. The inference for this verification can be that the pre-established confirmation response is equated with direct contact of the user interface 134 of the first user device 100 by a user within a second preset time after the user device 100 produces the audible challenge query. For example, the tactile user input can be one or more pre-established tactile inputs selected from among: (i) a selection of a touch screen control on a touch screen and/or touch pad 154, (ii) actuation of a push button of the keypad 156, (iii) a pattern of shaking of the first user device 100, and (iv) tracing at least one symbol on a touch screen and/or touch pad 154.

In at least one embodiment, the always-on privacy mode utility 122 further configures the user device 100 to receive a control input at a user interface 134 of the user device 100 to perform one of: (a) modifying. and (b) adding a pre-established confirmation response 146 assigned to one of the user device(s) 100 and the authorized user. To that end, the at least one sound receiving component 149 receives a new confirmation response from the authorized user 110. The always-on privacy mode utility updates the pre-established confirmation response 146 in the data storage device 142 to match the new confirmation response.

In one or more embodiments, the audible acknowledgement may be the same from two or more user devices and thus the uniqueness of the audible acknowledgement as the basis of distinguishing the audible acknowledgement originating from the first user device 100 from another user device is questionable. However, the audio amplitude and delay analyzer 128 can discern sound qualities that can be used to differentiate the first user device 100 from another user device. For example, due to processing delays by the first user device 100, another user device can respond first to the voice activation. Thus, even with a delay due to the time required for the sound to travel from the other user device to the first user device 100, a delay may be insufficient to distinguish when using one sound receiving component 149. In this instance, the audio amplitude variance between the two sources can be used to determine whether the source is the first user device 100 or another user device. In another instance, the first user device 100 can be in close proximity to another user device 100 such that delay and amplitude are not significantly different. However, the audio amplitude and delay analyzer utility 128 can detect differences between what the front microphone 150 and the back microphone 152 detects, and these differences can be utilized to distinguish the two audio input sources 210. In yet another example, due to the volume settings of the first user device 100 and another user device, the amplitude detected can be the same at the at least one sound receiving component 149. However, the distance can impart a delay that is detectable by the amplitude and delay analyzer utility 128.

Thus, in one or more embodiments, the user device 100 has a first sound producing component such as the front speaker 160 and a second sound producing component such as the back speaker 162. In addition, the at least one sound receiving component 149 includes a first sound receiving component such as the front microphone 150 and a second sound receiving component such as the back microphone 152 that are available to the audio amplitude and delay analyzer utility 128. The always-on privacy mode utility 122 can further configure the user device 100 to produce the first audible acknowledgement within the loudspeaker proximity or hands-free proximity of the user device 100 via the first sound producing component (front speaker 160). The first sound receiving component (front microphone 150) monitors for detection of the at least one second, audible acknowledgement produced within the pre-set time interval per the timer 236. Concurrently, the second sound receiving component (back microphone 152) monitors for detection of the at least one second, audible acknowledgement produced within the pre-set time interval. The audio amplitude and delay analyzer utility 128 detects and the always-on privacy mode utility 122 determines that the at least one second, audible acknowledgement is from another user device. This determination can be based upon receiving the second, audible acknowledgement at both sound receiving components 149 (front microphone 150 and back microphone 152) with at least one of loudness variation and a timing delay that indicates a displaced source from the sound producing component 159 (front speaker 160). For clarity, the first sound producing component 159 is indicated as being the front speaker 160; however, the first sound producing component 159 can be the back speaker 162 and the second sound producing component 159 can be the front speaker 160. In various embodiments, the sound receiving component 149 and/or sound producing component 159 can be selected based upon being used in a loudspeaker mode or an earpiece mode.

Aspects consistent with the present disclosure can include power saving features by relegating recognition of voice activation sounds to a voice monitor 131, such as the always-on module 132. The always-on privacy mode utility 122 can thus further configure the user device 100 to switch at least a portion of the voice-activated information assistant 130 of the user device 100 into a power saving mode while the voice monitor 131 (always-on module 132) remains activated. For example, portions of the processor 116 can operate at a lower performance level or be turned off. The voice monitor 131 can detect the first pre-established, audible activation command 102. In response to the voice monitor 131 detecting the activation command 102 (first pre-established, audible activation command) the always-on privacy mode utility 122 produces the first audible acknowledgement within the loudspeaker proximity or hands-free proximity of the user device 100.

Figure 3:
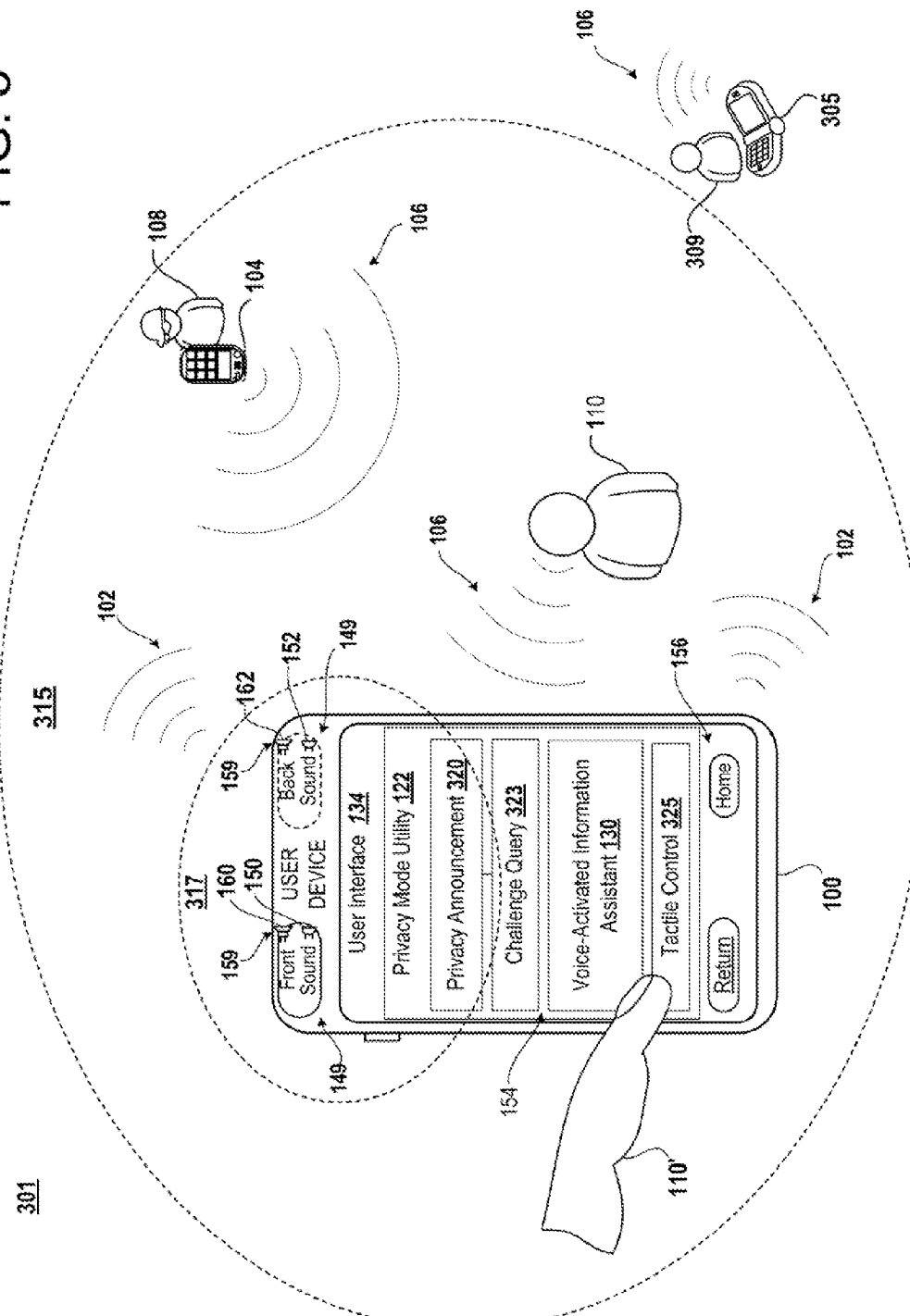
FIG. 3 is a block diagram illustration of an example user interface with functional components of an always-on privacy mode utility that enables entry of confirmation to a challenge on a first user device in the presence of multiple user devices, in accordance with one or more embodiments.

FIG. 3 illustrates an example first user device 100 being used within a multiple device space 301 along with a second user device 104. The first user device 100 employs an always-on voice command mode for convenience and for being accessible in hands-free situations. Thus, the authorized user 110 can interact with a voice-activated information assistant 130 depicted as having an application executing on the user interface 134. In particular, the authorized user 110 can be oriented or spaced apart from the first user device 100 within a hands-free proximity or a loudspeaker proximity 315 that is close enough for the authorized user 110 to hear the first user device 100 and to be heard by the first user device 100. When choosing or required to interact directly with the user interface 134, the authorized user 110 is within a hand-held proximity or earpiece proximity 317 that allows direct viewing or touching of a user interface 134. Earpiece proximity 317 also indicates that the volume of audible outputs from the first user device 100 is set to be appropriate for placing the ear of the authorized user 110 to the earpiece speaker, such as the front speaker 160.

In one or more embodiments, the user interface 134 displays and audibly responds to the authorized user 110 as depicted. For example, a privacy announcement 320, a challenge query 323 and a tactile input control 325 can be displayed on the user interface 134 and/or interfaced with as depicted at 110'. Similarly, the user interface 134 allows or in some instances requires direct interaction with the user interface 134 within earpiece proximity. Thresholds for audible volume and sensitivity for receiving audible voice commands can be pre-determined or adjusted to constrain the size of the loudspeaker proximity 315. For example, a third user device 305 and a third user 309 can be outside of the loudspeaker proximity 315. Thus, while third user device 305 may also detect voice activation signal 102, an audible acknowledgement 106 by the third user device 305 may have a variance in volume magnitude or time delay in arrival at the first user device 100 as to be undetectable.

In the illustrative scenario, each user device 100, 104 has a corresponding user associated therewith. Specifically, first user device 100 has a corresponding first user 110 and the second user device 104 has a corresponding second user 108. In the illustrative scenario, both of the first and second user devices 100, 104 are configured to monitor for the voice activation signal 102 and to respond with the audible acknowledgement 106. Privacy of the first user 110 can be compromised if the first user device 100 were to audibly disclose private information in response to a voice command that was not intended for the first user device 100, that did not originate from an authorized user, or that was not intended to be a voice command. To address this issue, the always-on privacy mode utility 122 of the first user device 100 prevents inadvertent audible response containing private information that can be overheard by the second user 108.

Figure 4:
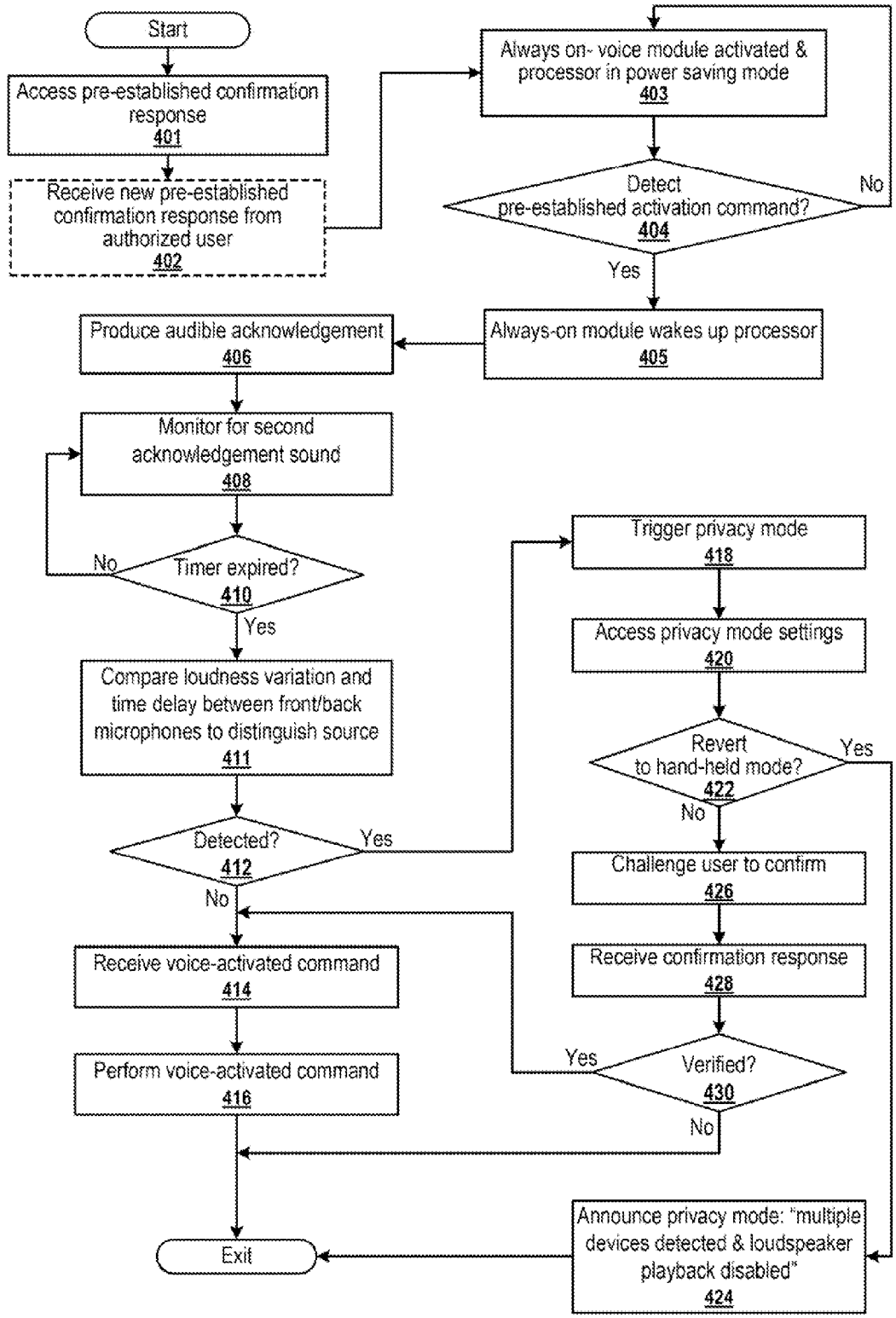
FIG. 4 is a flow diagram of an example method for discriminately providing audible responses to a voice command received by a user device that supports voice activation, in accordance with one or more embodiments.

FIG. 4 illustrates a method 400 for discriminately providing audible responses to a voice command received by a user device 100 that supports voice activation. According to one or more embodiments, method 400 illustrates having the voice activation signal 102 (e.g., first pre-established, audible activation command) be user configurable. According to one or embodiments, the method 400 also illustrates how the user device 100 can support power saving by relegating one or more voice monitoring functions to a separate integrated circuit, component or device, such as the always-on module 132 rather than a voice monitor 131 executing on the processor IC 114 (FIG. 1). Thereby, the voice monitoring functions can be optimized for low power with other functions requiring higher power consumption being performed by components that can placed into a power saving mode until activated. In addition, the method 400 depicts two general approaches to operation in a privacy mode when multiple devices are depicted. First, the user device 100 can at least temporarily revert to a hand-held mode requiring direct interaction with the user interface to thereby confirm that the authorized user 110 intended to initiate a voice command. The always-on voice mode is thus at least functionally and temporarily turned off. Second, the user device 100 can perform a privacy mode by requiring the authorized user 110 to uniquely confirm his/her identity. This latter approach is further illustrated with audible and/or tactile user confirmation responses in FIGS. 5A-5C according to various embodiments. In this latter approach requiring confirmation, the benefits of being hands-free continue, giving the authorized user 110 an opportunity to hear a query from the user device 100 from within loudspeaker proximity.

With continued reference to FIG. 4, the method 400 begins at the start block and proceeds to block 401 by the always-on privacy mode utility 122 accessing a pre-established confirmation response, if any. In block 402, the authorized user 110 can input a new pre-established confirmation response that is received by the always-on privacy mode utility 122. In some instances, the first user device 100 characterizes the new pre-established confirmation response against a standard for uniqueness and detectability before accepting the new pre-established confirmation response.

At some subsequent point in time, the method 400 continues with the processor IC 114 that executes a voice-activated information assistant 130 being in a power savings mode and an always-on module 132 in an active state. Repeatedly in decision block 404, the always-on module 132 determines whether the pre-established activation command has been detected. If not detected in block 404, then the always-on module 132 continues to monitor in block 403 and the method 400 remains in this waiting state. When detected in block 404, the always-on module 132 in block 405 wakes up the processor IC 114 so that the always-on privacy mode utility 122 can detect multiple devices and so that the voice activated information assistant 130 can respond to the authorized user 110 as allowed by the always-on privacy mode utility 122.

At block 406, the at least one sound producing component 159 produces a first audible acknowledgement within loudspeaker proximity of the user device 100. The processor IC 114 monitors for detection of at least one second, audible acknowledgement produced by another user device within a pre-set time interval in block 408. A determination is made in decision block 410 whether the pre-set time interval has expired. If the timer has not expired, processor IC 114 continues to monitor in block 408 for detection of at least one second, audible acknowledgement.

If the timer has expired, then at block 411, the audio amplitude and delay analyzer utility 128 compares loudness variation and time delay between front and back microphone to distinguish whether at least one second, audible acknowledgement is detected. Based upon the comparison in block 411, the always-on privacy mode utility 122 can determine in decision block 412 whether multiple devices have been detected. In particular, the always-on privacy mode utility 122 can determine that the second, audible acknowledgement is from another user device based upon receiving the second, audible acknowledgement at both the first sound receiving component and the second sound receiving component, with at least one of a loudness variation and a timing delay that indicates a displaced source from the first sound producing component.

If the second, audible acknowledgement was not detected in decision block 412, the first user device 100 is not in a multiple device situation and privacy mode is not warranted. As such, the voice-activated information assistant 130 can receive a voice-activated command in block 414. Then, the voice-activated information assistant 130 can perform the voice-activated command in block 416, following which the method 400 exits.

If, however, the at least one second audible acknowledgement is detected in decision block 412, the detection indicates that another user device is also responding to the first pre-established, audible activation command. Thus, in response to detecting multiple devices in block 412, the always-on privacy mode utility 122 in block 418 triggers a privacy mode for the first user device 100. In block 420, the always-on privacy mode utility 122 accesses privacy mode settings that dictate how the always-on privacy mode utility 122 configures the first user device 100 when in a privacy mode.

In one embodiment, the privacy mode can cause the user device 100 to revert to a hand-held mode, disabling always-on voice commands, at least temporarily. Thus, a determination can be made in decision block 422 as to whether the privacy mode settings accessed in block 420 indicate that the first user device 100 should to revert to hand-held mode when in privacy mode. If the determination in block 422 is to revert to hand-held mode, the always-on privacy utility 122 in block 424 can produce an announcement indicating that multiple devices have responded and indicating that loudspeaker playback is disabled. The privacy mode announcement can be output via at least one of the display 158 and a sound producing component 159 such as front speaker 160 and/or a back speaker 162. The method 400 then exits.

In another embodiment or due to a different configuration of the privacy settings 144, the determination in decision block 422 is not merely whether to disable voice-activated information assistant 130. Instead, in response to detecting at least one second, audible acknowledgement within the pre-set time interval, the method 400 provides for triggering entry into a privacy mode of audible command input. In block 426, the always-on privacy mode utility 122 challenges a user to confirm that the initial voice activation signal was received from the authorized user 110 of the user device 100 (versus another user 108 of a second user device). The always-on privacy mode utility 122 receives a confirmation response in block 428. A determination is made in decision block 430 whether the confirmation response is verified. If not verified in block 430, then method 400 exits. If the authorized user is verified in block 430, then the voice-activated information assistant 130 can be enabled to receive a voice-activated command in block 414 and to perform or respond to the voice-activated command in block 416.

Figure 5A:
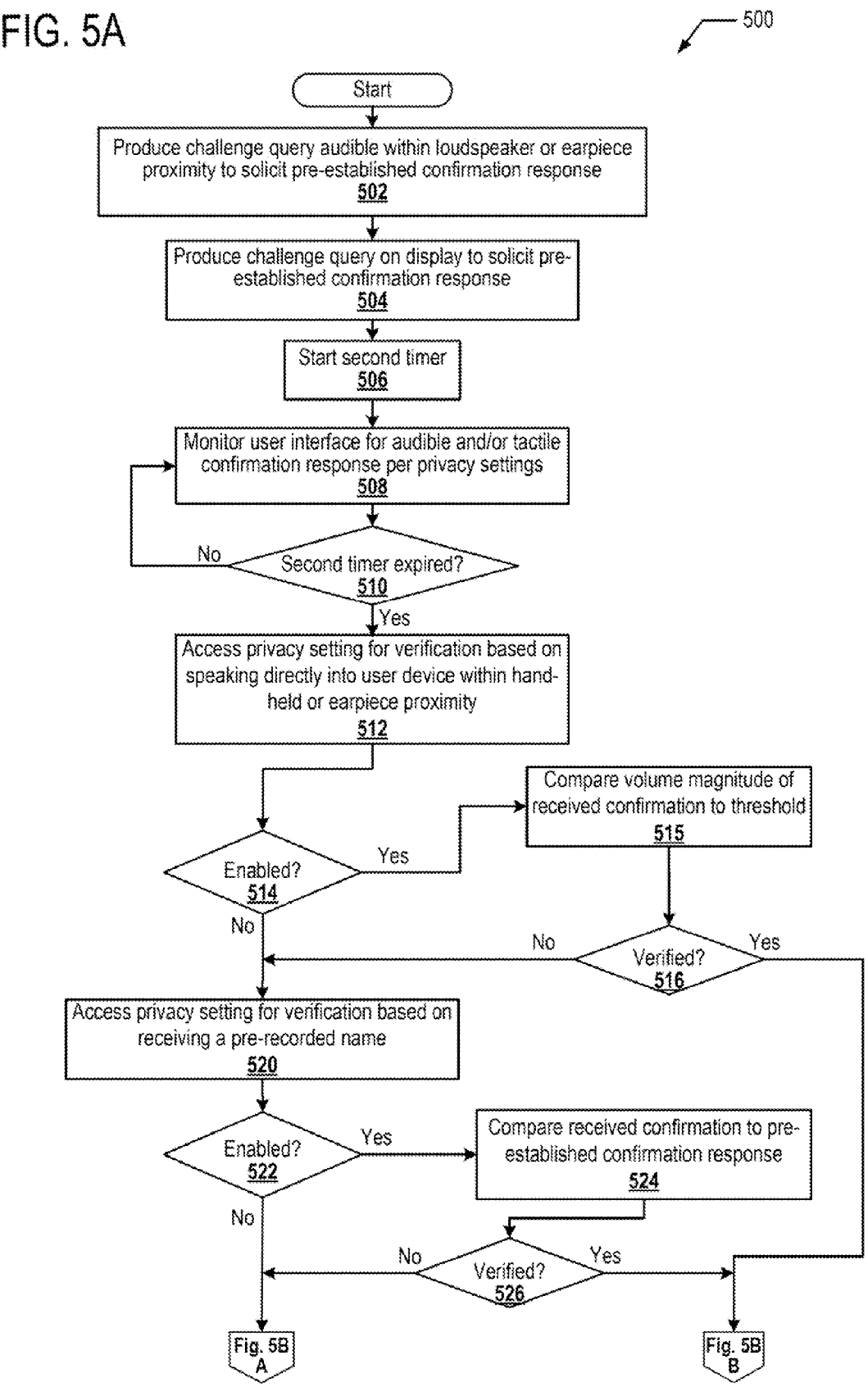

Turning to FIGS. 5A-5C, an example method 500 further illustrates the operations of challenging, receiving, and verifying introduced by block 426, 428 and 430 of method 400 (FIG. 4). Method 500 illustrates receiving an audible and/or a tactile confirmation response, according to various embodiments of the present disclosure. With initial reference to FIG. 5A, the method 500 begins at start block and proceeds to block 502 with at least one sound producing component producing an audible challenge query to solicit the pre-established confirmation response. In an exemplary aspect, the audible challenge query is produced at a loudspeaker volume to be heard by a user within loudspeaker proximity 315. Alternatively or in addition to producing an audible challenge query in block 502, the display 158 in block 504 can display a challenge query 323. In block 506, the always-on privacy mode utility 122 starts a second timer having a duration pre-set for a human response to a challenge query. In block 508, the always-on privacy mode utility 122 monitors the user interface for audible and/or tactile confirmation responses as enabled by the privacy settings. Repeated determinations are made in decision block 510 as to whether the second timer has expired. In one or more embodiments, the second timer can expire more quickly if the authorized user does not begin to make inputs to the first user device 100 whereas the second timer can expire more slowly once inputs are detected, allowing the authorized user to complete the confirmation response. If the timer has not expired in decision block 510, then the always-on privacy mode utility 122 continues to monitor in block 508.

If the determination is that the second timer has expired in block 510, then the always-on privacy mode utility 122 accesses the privacy settings in block 512 with regard to the one or more manners in which the always-on privacy mode utility 122 is configured to determine whether an authorized user has been verified. In a first illustrative determination, the always-on-privacy mode utility 122 accesses settings regarding verification based upon the authorized user speaking directly into the first user device 100. A determination is made in decision block 514 as to whether this first verification setting is enabled. If enabled in decision block 514, then the always-on privacy mode utility 122 compares the volume magnitude of the received confirmation as measured by the audio amplitude and delay analyzer utility 128 to a threshold. After the comparison in block 515, the always-on privacy mode utility 122 makes a determination in decision block 516 as to whether the confirmation response is verified based on the comparison.

With reference to FIG. 5C, if the determination in block 516 is that the confirmation response is verified according to the first verification setting, then in block 517 the always-on privacy mode utility 122 concludes that the authorized user is confirmed and in block 518 continues voice control operations in an always-on voice mode. Method 500 then exits.

Returning to FIG. 5A, if, however, the confirmation response was not verified using the first verification setting in block 516 or if the first verification setting was not enabled in block 514, then the always-on-privacy mode utility 122 accesses privacy settings regarding a second verification setting in block 520 based upon a pre-recorded name of the authorized user. A determination is made in decision block 522 as to whether this second verification setting is enabled. If enabled in decision block 522, then in block 524 the always-on privacy mode utility 122 compares the received confirmation response to the pre-established confirmation response, which is the pre-recorded name. After the comparison in block 524, the always-on privacy mode utility 122 makes a determination in decision block 526 as to whether the confirmation response is verified based the comparison.

With reference to FIG. 5C, if the determination in decision block 526 is that the confirmation response is verified according to the second verification setting, then in block 517 the always-on privacy mode utility 122 concludes that the authorized user is confirmed and in block 518 continues voice control operations in an always-on voice mode. Method 500 then exits.

Returning to FIG. 5A, if, however, the confirmation response was not verified using the second verification setting in block 526 or if the second verification setting was not enabled in block 522, then continuing to FIG. 5B the always-on-privacy mode utility 122 accesses privacy settings regarding a third verification setting in block 528 based upon an identifier associated with the first user device 100. A determination is made in decision block 530 as to whether this third verification setting is enabled. If enabled in decision block 530, then the always-on privacy mode utility 122 compares the received confirmation response in block 532 to the pre-established confirmation response, which is the identifier associated with the first user device 100. After the comparison in block 532, the always-on privacy mode utility 122 makes a determination in decision block 534 as to whether the confirmation response is verified based the comparison.

With reference to FIG. 5C, if the determination in block 534 is that the confirmation response is verified according to the third verification setting, then in block 517 the always-on privacy mode utility 122 concludes that the authorized user is confirmed and in block 518 continues voice control operations in an always-on voice mode. Method 500 then exits.

Returning to FIG. 5B, if, however, the confirmation response was not verified using the third verification setting in decision block 534 or if the third verification setting was not enabled in decision block 530, then the always-on privacy mode utility 122 accesses privacy settings regarding a fourth verification setting in block 536 based upon the user interface 134 receiving any input that is indicative of hand-held operation of the first user device 100. A determination is made in decision block 538 as to whether this fourth verification setting is enabled. If enabled in decision block 538, then the always-on privacy mode utility 122 compares the received confirmation response in block 540 to the pre-established confirmation response, which is physical or tactile input to the first user device 100. After the comparison in block 540, the always-on privacy mode utility 122 makes a determination in decision block 542 as to whether the confirmation response is verified based the comparison.

With reference to FIG. 5C, if the determination in decision block 542 is that the confirmation response is verified according to the fourth verification setting, then in block 517 the always-on privacy mode utility 122 concludes that the authorized user is confirmed and in block 518 continues voice control operations in an always-on voice mode. Method 500 then exits.

Returning to FIG. 5B, if, however, the confirmation response was not verified using the fourth verification setting in decision block 542 or if the fourth verification setting was not enabled in decision block 538, then the always-on-privacy mode utility 122 accesses privacy settings regarding a fifth verification setting in block 544 based upon the user device 100 receiving a pattern of movement or shaking indicative of hand-held operation of the first user device 100. A determination is made in decision block 546 as to whether this fifth verification setting is enabled. If enabled in decision block 546, then the always-on privacy mode utility 122 compares the received confirmation response in block 548 to the pre-established confirmation response, which is movement or shaking input to the first user device 100. After the comparison in block 548, the always-on privacy mode utility 122 makes a determination in decision block 550 as to whether the confirmation response is verified based on the comparison.

With reference to FIG. 5C, if the determination in block 550 is that the confirmation response is verified according to the fifth verification setting, then in block 517 the always-on privacy mode utility 122 concludes that the authorized user is confirmed and in block 518 continues voice control operations in an always-on voice mode. Method 500 then exits.

Returning to FIG. 5B, if, however, the confirmation response was not verified using the fifth verification setting in decision block 550 or if the fifth verification setting was not enabled in decision block 546, then the always-on-privacy mode utility 122 accesses privacy settings regarding a sixth verification setting in block 552 based upon the user interface 134 receiving a pattern of tracing one or more symbols on a touch screen 154. Continuing on FIG. 5C, a determination is made in decision block 554 as to whether this sixth verification setting is enabled. If enabled in decision block 554, then the always-on privacy mode utility 122 compares the received confirmation response in block 556 to the pre-established confirmation response, which is the traced symbol(s). After the comparison in block 556, the always-on privacy mode utility 122 makes a determination in decision block 558 as to whether the confirmation response is verified based the comparison. If the determination in decision block 558 is that the confirmation response is verified according to the sixth verification setting, then in block 517 the always-on privacy mode utility 122 concludes that the authorized user is confirmed and in block 518 continues voice control operations in an always-on voice mode. Method 500 then exits.

If, however, the confirmation response was not verified using the sixth verification setting in decision block 558 or if the sixth verification setting was not enabled in decision block 554, then the always-on-privacy mode utility 122 accesses privacy settings regarding a seventh verification setting in block 560 based upon the user interface 134 receiving tactile control input to the touch screen 154. For example, the touch screen control can be a keyword, virtual control selection, passcode entry, etc. A determination is made in decision block 562 as to whether this seventh verification setting is enabled. If enabled in decision block 562, then the always-on privacy mode utility 122 compares the received confirmation response in block 564 to the pre-established confirmation response, which is the tactile control input. After the comparison in block 564, the always-on privacy mode utility 122 makes a determination in decision block 566 as to whether the confirmation response is verified based the comparison. If the determination in block 566 is that the confirmation response is verified according to the seventh verification setting, then in block 517 the always-on privacy mode utility 122 concludes that the authorized user is confirmed and in block 518 continues voice control operations in an always-on voice mode. Method 500 then exits.

If, however, the confirmation response was not verified using the seventh verification setting in decision block 566 or if the seventh verification setting was not enabled in decision block 562, then the always-on-privacy mode utility 122 accesses privacy settings regarding an eighth verification setting in block 568 based upon the user interface 134 receiving tactile control input to the keypad 156. For example, the touch pad control input can be a typed keyword, control actuation, passcode entry, etc. A determination is made in decision block 570 as to whether this eighth verification setting is enabled. If enabled in decision block 570, then the always-on privacy mode utility 122 compares the received confirmation response in block 572 to the pre-established confirmation response, which is the tactile control input to the keypad 156. After the comparison in block 572, the always-on privacy mode utility 122 makes a determination in decision block 574 as to whether the confirmation response is verified based the comparison. If the determination in decision block 574 is that the confirmation response is verified according to the eighth verification setting, then in block 517 the always-on privacy mode utility 122 concludes that the authorized user is confirmed and in block 518 continues voice control operations in an always-on voice mode. Method 500 then exits. However, if the determination in decision block 574 is that the confirmation response is not verified based upon the eighth verification setting, or if the eighth verification setting was not enabled in decision block 570, then in block 576 the always-on privacy mode utility 122 concludes that no authorized user is confirmed and aborts voice control operation in block 578. Method 500 exits.

In each of the flow charts of FIG. 4 and FIGS. 5A-5C presented herein, certain steps of the methods can be combined, performed simultaneously or in a different order, or perhaps omitted, without deviating from the spirit and scope of the described innovation. While the method steps are described and illustrated in a particular sequence, use of a specific sequence of steps is not meant to imply any limitations on the innovation. Changes may be made with regards to the sequence of steps without departing from the spirit or scope of the present innovation. Use of a particular sequence is therefore, not to be taken in a limiting sense, and the scope of the present innovation is defined only by the appended claims.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

Aspects of the present innovation are described below with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

While the innovation has been described with reference to exemplary embodiments, it will be understood by those skilled in the art that various changes may be made and equivalents may be substituted for elements thereof without departing from the scope of the innovation. In addition, many modifications may be made to adapt a particular system, device or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description, but is not intended to be exhaustive or limited to the innovation in the form disclosed. Many modifications and variations will be apparent to those of ordinary skill in the art without departing from the scope and spirit of the innovation. The embodiment was chosen and described in order to best explain the principles of the innovation and the practical application, and to enable others of ordinary skill in the art to understand the innovation for various embodiments with various modifications as are suited to the particular use contemplated.

What is claimed is:

1. A method comprising:
   detecting, by a user device, a pre-established, audible activation command that activates the user device;
   in response to detecting the pre-established, audible activation command, producing, by the user device, a first audible acknowledgement that is audible at least within a loudspeaker proximity of the user device;
   monitoring, by the user device, for detection of at least one second audible acknowledgement produced by another user device within a pre-set time interval;
   in response to not detecting the at least one second audible acknowledgement within the pre-set time interval:
      processing, by the user device, a received audible command; and
      produce, by the user device, a response to the received audible command;
   in response to detecting the at least one second audible acknowledgement within the pre-set time interval:
      triggering, by the user device, entry into a privacy mode of audible command input; and
      producing, by the user device and for output via one or more of a display or a sound producing component, a privacy mode announcement.

2. The method of claim 1, wherein producing the privacy mode announcement comprises indicating that multiple devices were detected and indicating that loudspeaker playback is disabled.

3. The method of claim 1, wherein processing and producing the response to the received audible command comprises:
   measuring a volume magnitude of the received audible command;
   comparing the volume magnitude to a loudness threshold that is pre-selected to indicate when a user is speaking directly into the user device; and
   in response to the volume magnitude exceeding the loudness threshold, processing and producing the response to the received audible command.

4. The method of claim 1, wherein producing the privacy mode announcement comprises:
   generating a challenge requesting confirmation that the pre-established, audible activation command originated from an authorized user of the user device;
   receiving a confirmation response to the challenge; and
   in response to the received confirmation response being verified as a pre-established confirmation response that is assigned to the user device, processing and responding to the received audible command.

5. The method of claim 4, wherein:
   generating the challenge requesting confirmation that the first pre-established, audible activation command originated from the authorized user of the user device comprises producing a challenge query that solicits the pre-established confirmation response as an audible response that is detectable at least within the loudspeaker proximity of the user device;
   receiving an audible confirmation response to the challenge query; and
   verifying that the pre-established, audible activation command originated from the authorized user of the user device by comparing the received audible confirmation response to the pre-established confirmation response for a match.

6. The method of claim 5, wherein the verifying comprises comparing the received audible confirmation response to a pre-selected one of a specific identifier assigned to the user device or a pre-recorded name of the authorized user.

7. The method of claim 4, wherein:
   generating the challenge requesting confirmation that the pre-established, audible activation command originated from the authorized user of the user device comprises producing an audible challenge query that is audible within the loudspeaker proximity of the user device;
   receiving the confirmation response to the challenge includes detecting a tactile user input at a user interface of the user device; and
   the method further comprises verifying that the pre-established, audible activation command originated from the authorized user of the user device based on a user providing the tactile user input within a preset time after producing the audible challenge query.

8. The method of claim 7, wherein:
   the tactile user input comprises a pre-established tactile input from among at least one of (i) a selection of a touch screen control, (ii) an actuation of a push button, (iii) a pattern of shaking the user device, or (iv) a tracing of at least one symbol on a touch screen.

9. The method of claim 4, wherein prior to detecting the pre-established, audible activation command, the method further comprises:
   receiving a control input at a user interface of the user device to perform one of (a) modifying or (b) adding a pre-established confirmation response assigned to one of the user device or the authorized user;
   receiving a new confirmation response from the authorized user; and
   updating the pre-established confirmation response to match the new confirmation response.

10. The method of claim 4, wherein:
    producing the first audible acknowledgement that is audible at least within the loudspeaker proximity of the user device comprises producing the first audible acknowledgement via a first sound producing component;
    monitoring for detection of the at least one second audible acknowledgement produced by another device within the pre-set time interval comprises monitoring, via a first sound receiving component, for detection of the at least one second audible acknowledgement;
    the method further comprises:
       concurrently monitoring, via a second sound receiving component, for detection of the at least one second audible acknowledgement produced within the preset time interval; and determining that the at least one second audible acknowledgement is from another user device based upon receiving the second audible acknowledgement at both the first sound receiving component and the second sound receiving component with at least one of a loudness variation or a timing delay that indicates a displaced source from the first sound producing component.

11. The method of claim 4, further comprising:
switching at least a portion of a voice-activated information assistant of the user device into a power saving mode while a voice monitor remains activated,
wherein detecting the pre-established, audible activation command comprises detecting the pre-established, audible activation command by the voice monitor, and
wherein producing the first audible acknowledgement comprises that is audible at least within the loudspeaker proximity of the user device comprises, in response to detecting the pre-established, audible activation command, the voice monitor activating the voice-activated information assistant to produce the first audible acknowledgement.

12. A user device, comprising:
at least one sound producing component;
at least one sound receiving component;
a user interface comprising a display;
at least one processor that is communicatively coupled to the user interface, the at least one sound receiving component, and the at least one sound producing component;
a memory configured to store instructions that, when executed by the at least one processor, configure the user device to:
detect, via the at least one sound receiving component, a pre-established, audible activation command that activates the user device;
in response to detecting the pre-established, audible activation command, produce, via the at least one sound producing component, a first audible acknowledgement that is audible at least within a loudspeaker proximity of the user device;
monitor, via the at least one sound receiving component, for detection of at least one second audible acknowledgement produced by another user device within a pre-set time interval;
in response to not detecting the at least one second audible acknowledgement within the pre-set time interval:
process, via the at least one sound receiving component, a received audible command; and
produce a response to the received audible command;
in response to detecting the at least one second audible acknowledgement within the pre-set time interval:
trigger entry into a privacy mode of audible command input; and
produce, for output via one or more of the display or the at least one sound producing component, a privacy mode announcement.

13. The user device of claim 12, wherein the instructions, when executed by the at least one processor, further configure the user device to:
produce the privacy mode announcement by indicating that multiple devices were detected and indicating that loudspeaker playback is disabled; and
process and respond to a subsequently received command in response to receiving a tactile control input to the user interface of the user device.

14. The user device of claim 12, wherein the instructions, when executed by the at least one processor, further configure the user device to:
measure a volume magnitude of the received audible command;
compare the volume magnitude to a loudness threshold that is pre-selected to indicate when a user is speaking directly into the user device; and
in response to the volume magnitude exceeding the loudness threshold, process and produce the response to the received audible command.

15. The user device of claim 12, wherein the instructions, when executed by the at least one processor, further configure the user device to:
generate a challenge requesting confirmation that the pre-established, audible activation command originated from an authorized user of the user device;
receive a confirmation response to the challenge; and
in response to the received confirmation response being verified as a pre-established confirmation response that is assigned to the user device, process and respond to the received audible activation command.

16. The user device of claim 15, wherein the instructions, when executed by the at least one processor, further configure the user device to:
generate the challenge requesting confirmation that the first pre-established, audible activation command originated from the authorized user of the user device by producing, via the at least one sound producing component, a challenge query that solicits the pre-established confirmation response as an audible response that is detectable within the loudspeaker proximity of the user device;
receive, via the at least one sound receiving component, an audible confirmation response to the challenge query; and
verify that the pre-established, audible activation command originated from the authorized user of the user device by comparing the received audible confirmation response to the pre-established confirmation response for a match.

17. The user device of claim 16, wherein the instructions, when executed by the at least one processor, further configure the user device to:
verify by comparing the received audible confirmation response to a pre-selected one of a specific identifier assigned to the user device or a pre-recorded name of the authorized user.

18. The user device of claim 15,
wherein the instructions, when executed by the at least one processor, further configure the user device to:
generate the challenge requesting confirmation that the pre-established, audible activation command originated from the authorized user of the user device by producing, via the at least one sound producing component, an audible challenge query that is audible within the loudspeaker proximity of the user device;
receive the confirmation response to the challenge includes detecting a tactile user input at the user interface of the user device; and
verify that the pre-established, audible activation command originated from the authorized user of the user device based on a user providing the tactile user input within a preset time after producing the audible challenge query.

19. The user device of claim 18, wherein:
the tactile user input comprises a pre-established tactile input from among at least one of (i) a selection of a touch screen control, (ii) an actuation of a push button, (iii) a pattern of shaking the user device, or (iv) a tracing of at least one symbol on a touch screen.

20. The user device of claim 15,
wherein prior to the at least one sound receiving component detecting the pre-established, audible activation command, the instructions, when executed by the at least one processor, further configure the user device to:
receive a control input at a user interface of the user device to perform one of (a) modifying or (b) adding a pre-established confirmation response assigned to one of the user device or the authorized user;
receive, via the at least one sound receiving component, a new confirmation response from the authorized user; and
update the pre-established confirmation response to match the new confirmation response.

21. The user device of claim 15, wherein:
the at least one sound producing component comprises a first sound producing component and a second sound producing component;
the at least one sound receiving component comprises a first sound receiving component and a second sound producing component; and
the instructions, when executed by the at least one processor, further configure the user device to:
produce the first audible acknowledgement within the loudspeaker proximity of the user device via the first sound producing component;
monitor, via the first sound receiving component, for detection of the at least one second audible acknowledgement produced by another device within the pre-set time interval;
concurrently monitor, via the second sound receiving component, for detection of the at least one second audible acknowledgement produced within the pre-set time interval; and
determine that the at least one second audible acknowledgement is from another user device based upon receiving the second audible acknowledgement at both the first sound receiving component and the second sound receiving component with at least one of loudness variation or a timing delay that indicates a displaced source from the first sound producing component.

22. The user device of claim 15,
wherein the instructions, when executed by the at least one processor, further the user device to:
switch at least a portion of a voice-activated information assistant of the user device into a power saving mode while a voice monitor remains activated;
detect the pre-established, audible activation command by the voice monitor; and
in response to detecting the pre-established, audible activation command, activate, via the voice monitor, the voice-activated information assistant produces the first audible acknowledgement within the loudspeaker proximity of the user device.

* * * * *